United States Patent
Huang et al.

(10) Patent No.: US 6,927,960 B2
(45) Date of Patent: Aug. 9, 2005

(54) CIRCUIT PROTECTION DEVICE

(75) Inventors: Jian-Rong Huang, Hsin-Chu (TW); Liang-Pin Tai, Tainan Hsien (TW); Jing-Meng Liu, Hsin-Chu (TW)

(73) Assignee: Richtek Technology Corp. (TW)

( * ) Notice: Subject to any disclaimer, the term of this patent is extended or adjusted under 35 U.S.C. 154(b) by 311 days.

(21) Appl. No.: 10/282,062

(22) Filed: Oct. 29, 2002

(65) Prior Publication Data

US 2003/0179529 A1 Sep. 25, 2003

(30) Foreign Application Priority Data

Mar. 19, 2002 (TW) ....................................... 91203308 U

(51) Int. Cl.[7] .............................................. H02H 5/04
(52) U.S. Cl. ........................................ 361/93.8; 361/24
(58) Field of Search ............................... 361/93.8, 93.9, 361/24, 103

(56) References Cited

U.S. PATENT DOCUMENTS 3,959,713 A * 5/1976 Davis et al. ................ 323/278

* cited by examiner

*Primary Examiner*—Brian Sircus
*Assistant Examiner*—Boris Benenson
(74) *Attorney, Agent, or Firm*—Hunton & Williams LLP

(57) ABSTRACT

A circuit protection device includes an overheat protecting circuit connected to a main circuit and capable of being activated so as to shut down the main circuit when operating temperature of the main circuit reaches a predetermined value, and a current limiting circuit connected to the main circuit for preventing current through the main circuit from exceeding a predetermined threshold value. The current limiting circuit is further connected to the overheat protecting circuit and controls activation of the overheat protecting circuit when the current through the main circuit reaches the predetermined threshold value. Therefore, erroneous operation of the circuit protection device due to a shift in component characteristics of the overheat protecting circuit attributed to limitations in fabrication can be avoided.

10 Claims, 3 Drawing Sheets

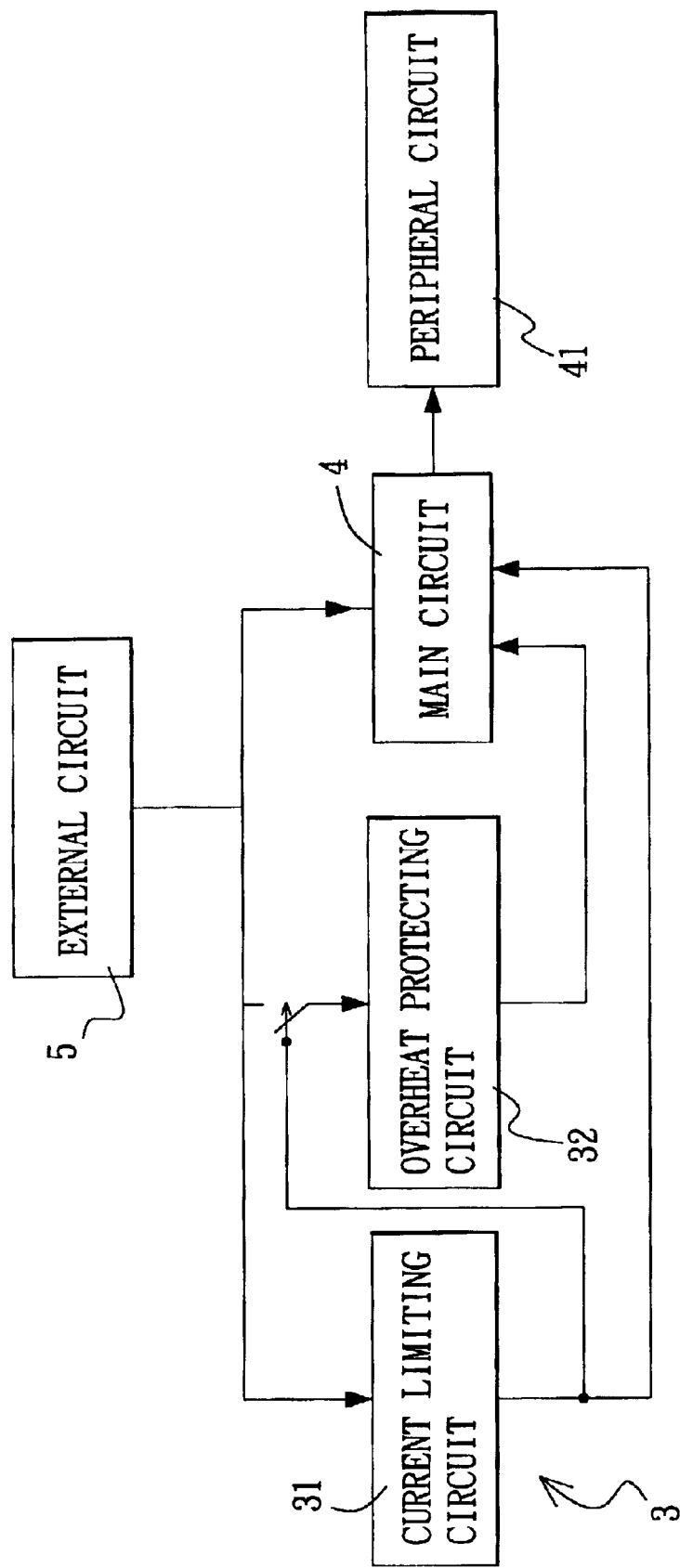
F I G. 2

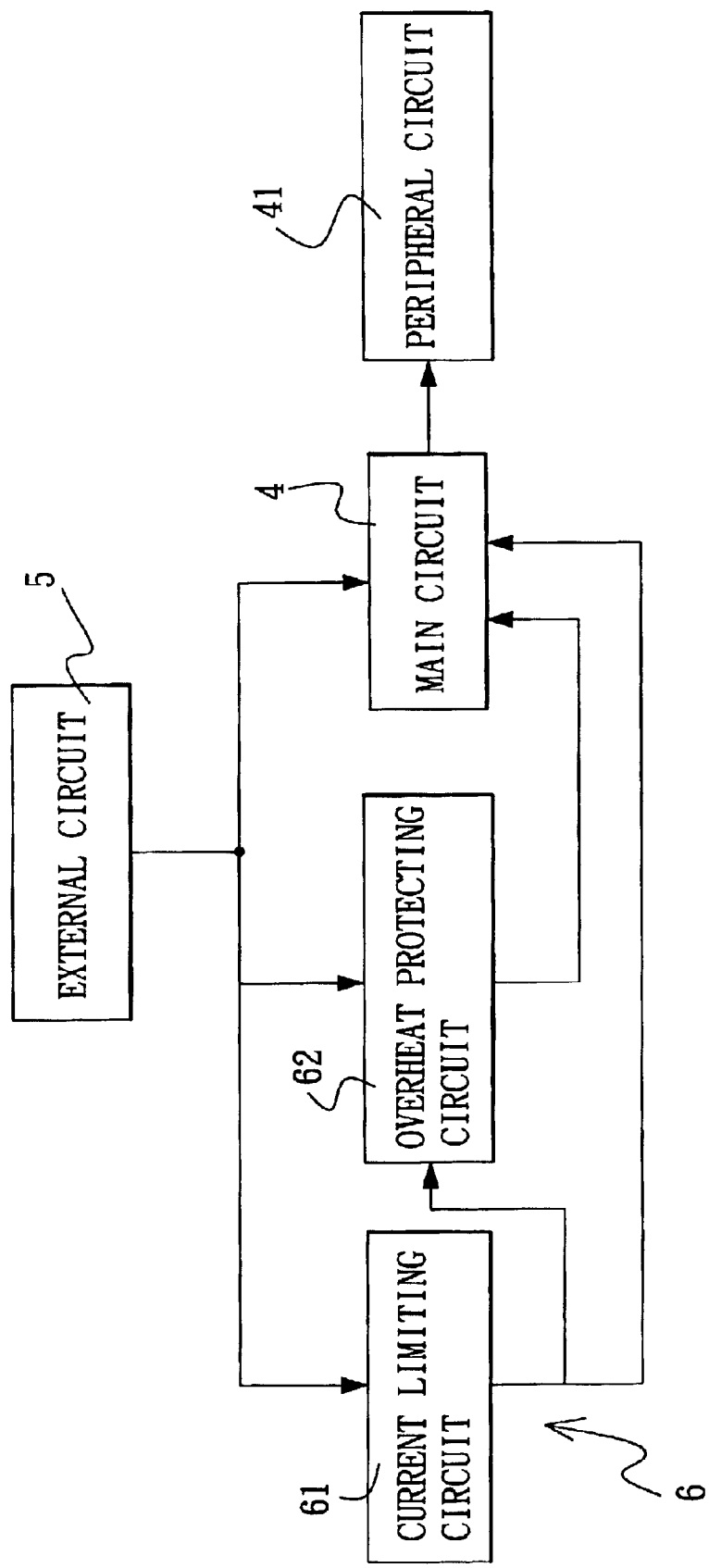
F I G. 3

CIRCUIT PROTECTION DEVICE

CROSS-REFERENCE TO RELATED APPLICATION

This application claims priority of Taiwanese Application No. 091203308, filed on Mar. 19, 2002.

BACKGROUND OF THE INVENTION

1. Field of the Invention

The invention relates to a circuit protection device, more particularly to a circuit protection device that can effectively provide over-current and overheating protection to a main circuit.

2. Description of the Related Art

FIG. 1 illustrates a conventional circuit protection device 1 for providing over-current and overheating protection to a power supply system 2 that is used for supplying electric power to a peripheral circuit 21. The conventional circuit protection device 1 includes a current limiting circuit 11 connected to the power supply system 2 for limiting current through the power supply system 2 to a limited current value when the current through the power supply system 2 reaches a predetermined threshold value, and an overheat protecting circuit 12 connected to the power supply system 2 for shutting down the power supply system 2 when the operating temperature of the power supply system 2 reaches a predetermined value. Usually, the predetermined value is set to be within a range of 150° C.~170° C. Hence, the overheat protecting circuit 12 shuts down the power supply system 2 once the operating temperature of the power supply system 2 reaches 150° C.~170° C.

However, the predetermined value shifts as a result of differences between ideal and actual characteristics of components of the overheat protecting circuit 12 due to limitations in fabrication. For example, if the actual value shifts from an ideal value (such as 150° C.) to a lower value (such as 130° C.) or a higher value (such as 190° C.), the overheat protecting circuit 12 may inappropriately shut down the power supply system 2 even though the operating temperature of the power supply system 2 has yet to reach 150° C., thereby resulting in reduced efficiency; or the overheat protecting circuit 12 may fail to shut down the power supply system 2 when the operating temperature of the power supply system 2 exceeds 150° C., which can result in damage to the power supply system 2.

SUMMARY OF THE INVENTION

Therefore, the object of the present invention is to provide a circuit protection device which can effectively provide over-current and overheating protection to a main circuit in spite of shifts in component characteristics due to limitations in fabrication.

According to the present invention, a circuit protection device is used to provide over-current and overheating protection to a main circuit, and comprises:

an overheat protecting circuit adapted to be connected to the main circuit and capable of being activated so as to be adapted to shut down the main circuit when operating temperature of the main circuit reaches a predetermined value; and a current limiting circuit adapted to be connected to the main circuit for preventing current through the main circuit from exceeding a predetermined threshold value, the current limiting circuit being further connected to the overheat protecting circuit and controlling activation of the overheat protecting circuit when the current through the main circuit reaches the predetermined threshold value.

BRIEF DESCRIPTION OF THE DRAWINGS

Other features and advantages of the present invention will become apparent in the following detailed description of the preferred embodiments with reference to the accompanying drawings, of which:

FIG. 2 is a schematic circuit block diagram illustrating the first preferred embodiment of a circuit protection device according to the present invention; and FIG. 3 is a schematic circuit block diagram illustrating the second preferred embodiment of a circuit protection device according to the present invention.

DETAILED DESCRIPTION OF THE PREFERRED EMBODIMENTS

Figure 1:
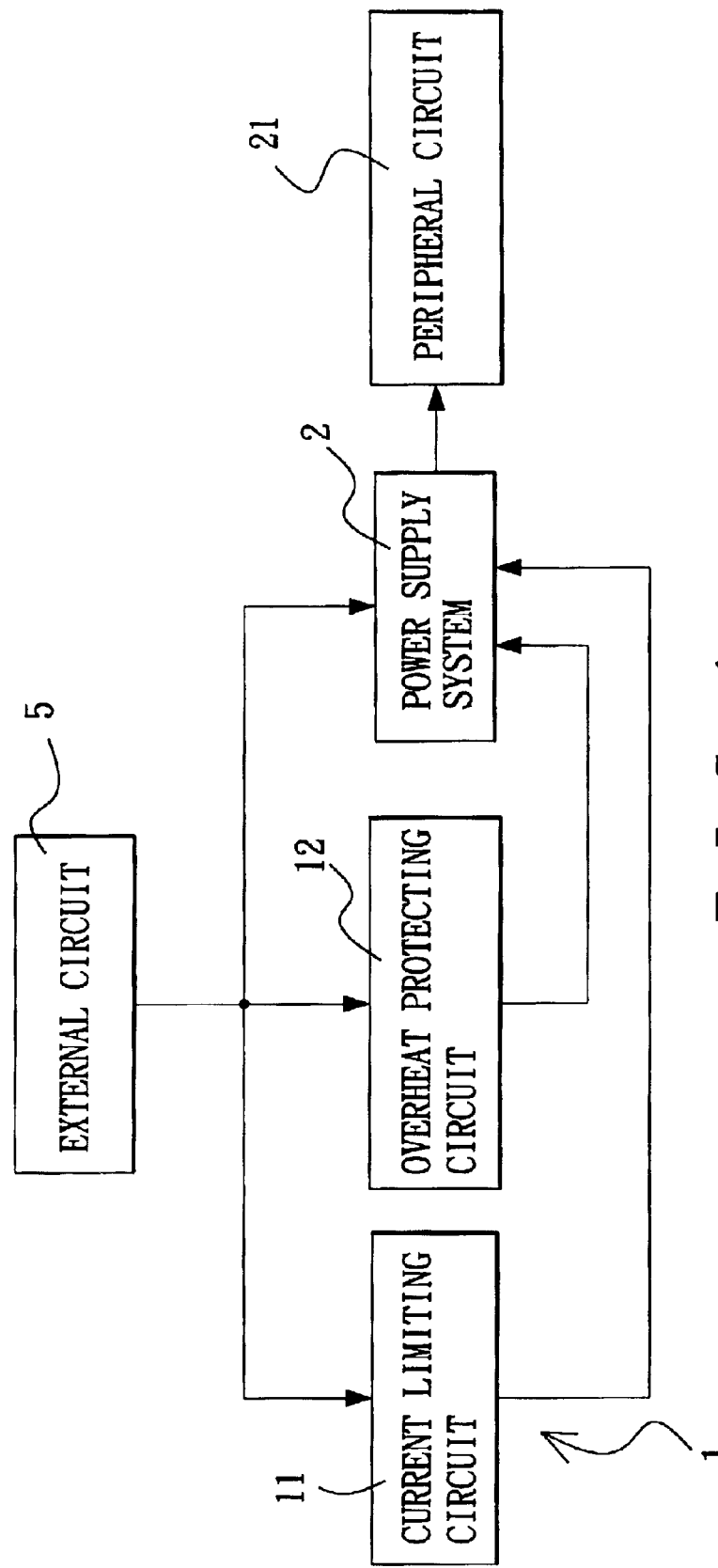
FIG. 1 is a schematic circuit block diagram illustrating a conventional circuit protection device.

Before the present invention is described in greater detail, it should be noted that like elements are denoted by the same reference numerals throughout the disclosure.

Referring to FIG. 2, the first preferred embodiment of a circuit protection device 3 according to the present invention is used for providing over-current and overheating protection to a main circuit 4, and is shown to include an overheat protecting circuit 32 and a current limiting circuit 31. In this embodiment, the main circuit 4 is a known power supply system for providing electric power in a known manner to a peripheral circuit 41. An external circuit 5 is used to supply electric power to the main circuit 4, the current limiting circuit 31 and the overheat protecting circuit 32.

The overheat protecting circuit 32 is adapted to be connected to the main circuit 4 and is capable of being activated so as to be adapted to shut down the main circuit 4 when operating temperature of the main circuit 4 reaches a predetermined value.

The current limiting circuit 31 is adapted to be connected to the main circuit 4 for preventing current through the main circuit 4 from exceeding a predetermined threshold value. In this embodiment, in order to avoid undesirable shut down of the main circuit 4 when an overheat condition has yet to occur, the undesirable shut down being attributed to a shift in component characteristics of the overheat protecting circuit 32 that arises from limitations in fabrication, the current limiting circuit 31 is further connected to the overheat protecting circuit 32 and controls activation of the overheat protecting circuit 32 when the current through the main circuit 4 reaches the predetermined threshold value. In this embodiment, when the current through the main circuit 4 has yet to reach the predetermined threshold value, the current limiting circuit 31 disables the overheat protecting circuit 32 (i.e., the external circuit 5 is disconnected from the overheat protecting circuit 32 so as to terminate power supply thereto) so as to prevent the overheat protecting circuit 32 from shutting down the main circuit 4. However, when the current through the main circuit 4 reaches the predetermined threshold value (i.e., an over-current condition has occurred), the current limiting circuit 31 enables the overheat protecting circuit 32 (i.e., the external circuit 5 is connected to the overheat protecting circuit 32 so as to provide power supply thereto) so that the overheat protecting circuit 32 can shut down the main circuit 4 once the operating temperature of the main circuit 4 reaches the predetermined value. The current limiting circuit 31 is adapted to limit the current through the main circuit 4 to a limited current value when the current through the main circuit 4 reaches the predetermined threshold value, wherein the predetermined threshold value is larger than the limited current value.

For example, if the predetermined value set by the overheat protecting circuit 32 is reduced from 150° C. (a correct value) to 120° C. (an incorrect value) as a result of limitations during fabrication, as long as the current through the main circuit 4 has yet to reach the predetermined threshold value, such as 1.6 Amp, the current limiting circuit 31 disables the overheat protecting circuit 32 so as to prevent the overheat protecting circuit 32 from shutting down the main circuit 4 even though the operating temperature of the main circuit 4 has reached 120° C. On the other hand, when the current through the main circuit 4 reaches 1.6 Amp, and the operating temperature of the main circuit 4 reaches 150° C. (larger than the actual value of 120° C.), the current limiting circuit 31 limits the current through the main circuit 4 to the limited current value, such as 1.5 Amp, and enables the overheat protecting circuit 32 so that the overheat protecting circuit 32 will be able to shut down the main circuit 4.

In practice, when an over-current condition has occurred in the main circuit 4, it is possible that the operating temperature of the main circuit 4 has yet to reach an overheating condition. Thus, in the first preferred embodiment of the present invention, the current limiting circuit 31 is used to control the overheat protecting circuit 32 so that when an over-current condition occurs, the current through the main circuit 4 is limited to the limited current value, and the overheat protecting circuit 32 will be enabled as well so as to provide both over-current and overheating protection to the main circuit 4. As such, even if the predetermined value set by the overheat protecting circuit 32 is determined to be a lower abnormal value due to limitations during fabrication of components thereof, the circuit protection device 3 can avoid inappropriate shut down of the main circuit 4, which usually occurs in the aforesaid conventional circuit protection device.

FIG. 3 illustrates the second preferred embodiment of a circuit protection device 6 according to the present invention, which is a modification of the first preferred embodiment. Unlike the previous embodiment, the circuit protection device 6 can ensure shut down of the main circuit 4 when an overheat condition occurs even though predetermined values set by the overheat protecting circuit 62 are abnormally high due to a shift in component characteristics of the overheat protecting circuit 62 that arises from limitations in fabrication. In this embodiment, when the current through the main circuit 4 has yet to reach the predetermined threshold value, the current limiting circuit 61 enables the overheat protecting circuit 62 to shut down the main circuit 4 once the operating temperature of the main circuit 4 reaches a predetermined first value. On the other hand, when the current through the main circuit 4 reaches the predetermined threshold value, aside from limiting the current through the main circuit 4 to the limited current value, the current limiting circuit 61 further enables the overheat protecting circuit 62 to shut down the main circuit 4 once the operating temperature of the main circuit 4 reaches a predetermined second value lower than the predetermined first value.

For example, it is assumed that the predetermined first and second values set by the overheat protecting circuit 32 are raised from 150° C. (a correct first value) to 180° C. (an incorrect first value) and from 120° C. (a correct second value) to 150° C. (an incorrect second value), respectively, as a result of limitations during fabrication. When the current through the main circuit 4 has yet to reach the predetermined threshold value, such as 1.6 Amp, the current limiting circuit 61 enables the overheat protecting circuit 62 to shut down the main circuit 4 once the operating temperature of the main circuit 4 reaches the higher first value of 180° C. Thus, the overheat protecting circuit 62 is disabled from shutting down the main circuit 4 when the operating temperature of the main circuit 4 reaches the lower second value of 150° C. at this time. On the other hand, when the current through the main circuit 4 reaches the predetermined threshold value of 1.6 Amp, the current limiting circuit 61 limits the current through the main circuit 4 to the limited current value, such as 1.5 Amp, and enables the overheat protecting circuit 62 to shut down the main circuit 4 once the operating temperature of the main circuit 4 reaches the lower second value of 150° C.

Therefore, in the second preferred embodiment of the present invention, the current limiting circuit 61 is used to control the overheat protecting circuit 62 so that when an over-current condition occurs, the current through the main circuit 4 is limited to the limited current value, and the overheat protecting circuit 62 will be enabled to shut down the main circuit 4 once the operating temperature of the main circuit 4 reaches a predetermined lower value. As such, even if the predetermined first and second values set by the overheat protecting circuit 62 are determined to be higher abnormal values due to limitations during fabrication, the circuit protection device 6 can ensure appropriate shut down of the main circuit 4, which is usually not possible in the aforesaid conventional circuit protection device.

It is noted herein that the first and second preferred embodiments can be integrated to form a circuit protection device that can prevent inappropriate shut down and ensure appropriate shut down of a main circuit simultaneously.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A circuit protection device for providing over-current and overheating protection to a main circuit, said circuit protection device comprising:

an overheat protecting circuit adapted to be connected to the main circuit and capable of being activated so as to be adapted to shut down the main circuit when operating temperature of the main circuit reaches a predetermined value; and a current limiting circuit adapted to be connected to the main circuit for preventing current through the main circuit from exceeding a predetermined threshold value, said current limiting circuit being further connected to said overheat protecting circuit and controlling activation of said overheat protecting circuit when the current through the main circuit reaches the predetermined threshold value.

2. The circuit protection device as claimed in claim 1, wherein said current limiting circuit is adapted to limit the current through the main circuit to a limited current value when the current through the main circuit reaches the predetermined threshold value.

3. The circuit protection device as claimed in claim 2, wherein the predetermined threshold value is larger than the limited current value.

4. The circuit protection device as claimed in claim 1, wherein said current limiting circuit disables said overheat protecting circuit so as to prevent said overheat protecting circuit from shutting down the main circuit when the current through the main circuit has yet to reach the predetermined threshold value, and enables said overheat protecting circuit when the current through the main circuit reaches the predetermined threshold value so that said overheat protecting circuit can shut down the main circuit once the operating temperature of the main circuit reaches the predetermined value.

5. The circuit protection device as claimed in claim 4, wherein said current limiting circuit is adapted to limit the current through the main circuit to a limited current value when the current through the main circuit reaches the predetermined threshold value.

6. The circuit protection device as claimed in claim 5, wherein the predetermined threshold value is larger than the limited current value.

7. The circuit protection device as claimed in claim 1, wherein said current limiting circuit enables said overheat protecting circuit to shut down the main circuit once the operating temperature of the main circuit reaches a predetermined first value when the current through the main circuit has yet to reach the predetermined threshold value, and enables said overheat protecting circuit to shut down the main circuit once the operating temperature of the main circuit reaches a predetermined second value different from the predetermined first value when the current through the main circuit reaches the predetermined threshold value.

8. The current protection device as claimed in claim 7, wherein the predetermined second value is lower than the predetermined first value.

9. The circuit protection device as claimed in claim 7, wherein said current limiting circuit is adapted to limit the current through the main circuit to a limited current value when the current through the main circuit reaches the predetermined threshold value.

10. The circuit protection device as claimed in claim 9, wherein the predetermined threshold value is larger than the limited current value.

* * * * *